US009361436B2

(12) United States Patent
Cismas

(10) Patent No.: US 9,361,436 B2
(45) Date of Patent: Jun. 7, 2016

(54) MULTIPLE PROFILE AUTHENTICATION

(75) Inventor: Sorin Cismas, Southlake, TX (US)

(73) Assignee: Bank of America Corporation, Charlotte, NC (US)

(*) Notice: Subject to any disclaimer, the term of this patent is extended or adjusted under 35 U.S.C. 154(b) by 46 days.

(21) Appl. No.: 13/604,189

(22) Filed: Sep. 5, 2012

(65) Prior Publication Data

US 2014/0068266 A1   Mar. 6, 2014

(51) Int. Cl.
*H04L 9/32* (2006.01)
*G06F 21/31* (2013.01)
*H04L 29/06* (2006.01)
*G06Q 20/40* (2012.01)

(52) U.S. Cl.
CPC ............... *G06F 21/31* (2013.01); *G06Q 20/40* (2013.01); *H04L 9/321* (2013.01); *H04L 63/08* (2013.01); *H04L 63/102* (2013.01); *G06F 2221/2115* (2013.01)

(58) Field of Classification Search
CPC .......... H04L 9/32; H04L 9/321; H04L 63/08; H04L 63/102; G06F 21/31; G06F 21/32; G06F 21/34; G06F 21/00; G06F 2221/2115
See application file for complete search history.

(56) References Cited

U.S. PATENT DOCUMENTS

| 6,928,546 | B1 * | 8/2005 | Nanavati et al. ............. 713/186 |
| 7,346,923 | B2 | 3/2008 | Atkins et al. |
| 7,743,409 | B2 | 6/2010 | Gonzalez et al. |
| 7,748,031 | B2 | 6/2010 | Gonzalez et al. |
| 2006/0064502 | A1 | 3/2006 | Nagarajayya |
| 2008/0046984 | A1 * | 2/2008 | Bohmer et al. ................ 726/5 |
| 2008/0168539 | A1 | 7/2008 | Stein |
| 2009/0177587 | A1 | 7/2009 | Siegal et al. |
| 2009/0265753 | A1 | 10/2009 | Anderson et al. |
| 2009/0293108 | A1 | 11/2009 | Weeden |
| 2010/0161816 | A1 | 6/2010 | Kraft et al. |
| 2011/0126001 | A1 * | 5/2011 | Fu et al. ........................ 713/156 |
| 2011/0264809 | A1 | 10/2011 | Koster et al. |

* cited by examiner

*Primary Examiner* — Saleh Najjar
*Assistant Examiner* — Devin Almeida
(74) *Attorney, Agent, or Firm* — Banner & Witcoff, Ltd.; Michael A. Springs

(57) ABSTRACT

A system and method includes a service provider registering a plurality of profile IDs with a central authority and providing the profile IDs to an institution where the profile IDs are utilized by the institution for authentication of individual users, authorized to act on behalf of the institution. Each profile ID corresponds to an authentication template for the respective user, and the authentication templates are stored by the central authority. A first user transmits an electronic communication, first authentication information, and an indication of a first profile ID, which is received by the service provider. The service provider then receives the first authentication template from the central authority, which may be requested. The first authentication information is then matched to the first authentication template, and additional actions can be taken with respect to the communication after successful matching.

29 Claims, 4 Drawing Sheets

MULTIPLE PROFILE AUTHENTICATION

TECHNICAL FIELD

The invention relates to a system and method for authentication and exchange of secure communications, and more specifically, to a system and method for authentication utilizing multiple security profiles for different users within a single client or other business unit.

BACKGROUND

Current business-to-business connections offer secure ways to send and receive information, conduct transactions, and otherwise exchange confidential data. However, current business-to-business connections provide little to no ability to identify and differentiate between different sending users within a business or other institution, e.g., at the organizational unit or individual level. Current technologies do not provide this ability in a reliable or straightforward manner. Additionally, specific identification of different users within a business can raise privacy concerns, particularly when individual people are being identified by name and other private information. This concern grows further when a third-party is involved in the authentication process, as is often the case in current business-to-business connections. Current technologies also do not sufficiently protect senders' private information in this regard.

BRIEF SUMMARY

The present system and method are provided to solve the problems discussed above and other problems, and to provide advantages and aspects not provided by prior systems and methods of this type.

Aspects of the present disclosure relate to a method that may be computer-assisted and may be used in conjunction with one or more computer devices and/or memories or processors thereof. The method may include registering a first profile ID and a second profile ID with a central authority, and providing the first and second profile IDs to an institution, where the first and second profile IDs are utilized by the institution for authentication of first and second users, respectively, authorized to act on behalf of the institution. The first profile ID corresponds to a first authentication template for the first user and the second profile ID corresponds to a second authentication template for the second user, and the first and second authentication templates are stored by the central authority. An electronic communication, first authentication information, and an indication of the first profile ID are received from the first user, and then the first authentication template is received from the central authority. The first authentication information is then matched to the first authentication template, and additional actions can be taken with respect to the communication after successful matching. The indication of the first profile ID and the first authentication information may be included within the electronic communication. Additionally, the first authentication template may be requested from the central authority after receiving the indication of the first profile ID.

According to one aspect, the communication relates to a transaction with the institution involving the first user, and the transaction is conducted with the institution involving the first user, such that matching of the first authentication information to the first authentication template corresponding to the first profile ID is required for completion of the trans action.

According to another aspect, the first and second profile IDs may be requested from the central authority, such that the request does not include information identifying the first or second users, after which the first and second profile IDs are received from the central authority.

According to a further aspect, a service provider doing business with the institution may perform the method and further exchanges information about the first and second profile IDs with a second service provider doing business with the institution, to enable the second service provider to authenticate the first and second users using the first and second profile IDs.

According to yet another aspect, the first profile ID is associated with first entitlements, and the additional actions taken with respect to the communication are limited by the first entitlements. The second profile ID may likewise be associated with second entitlements that are different from the first entitlements, and additional actions may be taken with respect to a second communication received from the second user that are limited by the second entitlements.

According to a still further aspect, the communication may be encrypted. In this configuration, a first encryption key may be received from the first user in connection with the communication, and a second encryption key may be received from the central authority. The communication can then be decrypted using the first and second encryption keys.

Additional aspects relate to a method that includes receiving a request to register first and second profile IDs from a service provider doing business with an institution, where the first and second profile IDs are associated with first and second users, respectively, authorized to act on behalf of the institution. The first profile ID corresponds to a first authentication template for the first user and the second profile ID corresponds to a second authentication template for the second user, and the request does not include information identifying the first or second users. A notice of registration of the first and second profile IDs is then transmitted to the service provider, and the first and second profile IDs and the first and second authentication templates are stored in memory, such that the first profile ID is associated with the first authentication template and the second profile ID is associated with the second authentication template in the memory. An indication of the first profile ID may be received from the service provider, and the first authentication template is transmitted to the service provider after receiving the indication of the first profile ID. The first authentication template may be requested by the service provider.

According to one aspect, an indication of the second profile ID is received from the service provider, and the second authentication template is transmitted to the service provider after receiving the indication of the second profile ID.

According to another aspect, the authentication template may include one or more types of information selected from a group consisting of: a passcode, a barcode or other graphic information, RFID information, biometric information, a signature, and a stored file.

According to a further aspect, a second request to register third and fourth profile IDs is received from the service provider doing business with a second institution, where the third and fourth profile IDs are associated with third and fourth users, respectively, authorized to act on behalf of the second institution. The third profile ID corresponds to a third authentication template for the third user and the fourth profile ID corresponds to a fourth authentication template for the fourth user, and the request does not include information identifying the third or fourth users. A notice of registration of the third and fourth profile IDs is then transmitted to the service provider, and the third and fourth profile IDs and the third and fourth authentication templates are stored in memory, such that the third profile ID is associated with the third authentication template and the fourth profile ID is associated with the fourth authentication template in the memory. An indication of the third profile ID may be received from the service provider, and the third authentication template is transmitted to the service provider after receiving the indication of the third profile ID.

According to yet another aspect, a request is received from the service provider for an encryption key, and the encryption key is then transmitted to the service provider for use in decrypting a communication from the first user.

According to a still further aspect, the first and second profile IDs each have limited lifespans, and the method further includes receiving a first refreshment of the first profile ID from the service provider prior to expiration of the limited lifespan of the first profile ID, and receiving a second refreshment of the second profile ID from the service provider prior to expiration of the limited lifespan of the second profile ID.

Further aspects relate to a tangible and/or non-transitory computer-readable medium comprising computer-executable instructions configured to cause a computer device to perform at least some aspects and features of the methods described above.

Still further aspects relate to a system containing computer components that are configured to perform at least some aspects and features of the methods described above.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present disclosure, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more tangible and/or non-transitory computer-readable storage media having computer-readable program code, or instructions, embodied in or on the storage media. Any suitable tangible and/or non-transitory computer readable storage media may be utilized, including hard disks, CD-ROMs, optical storage devices, magnetic storage devices, and/or any combination thereof. In addition, various intangible signals representing data or events as described herein may be transferred between a source and a destination in the form of electromagnetic waves traveling through signal-conducting media such as conductive (e.g. metal) wires, optical fibers, and/or wireless transmission media (e.g., air and/or space).

Figure 1:
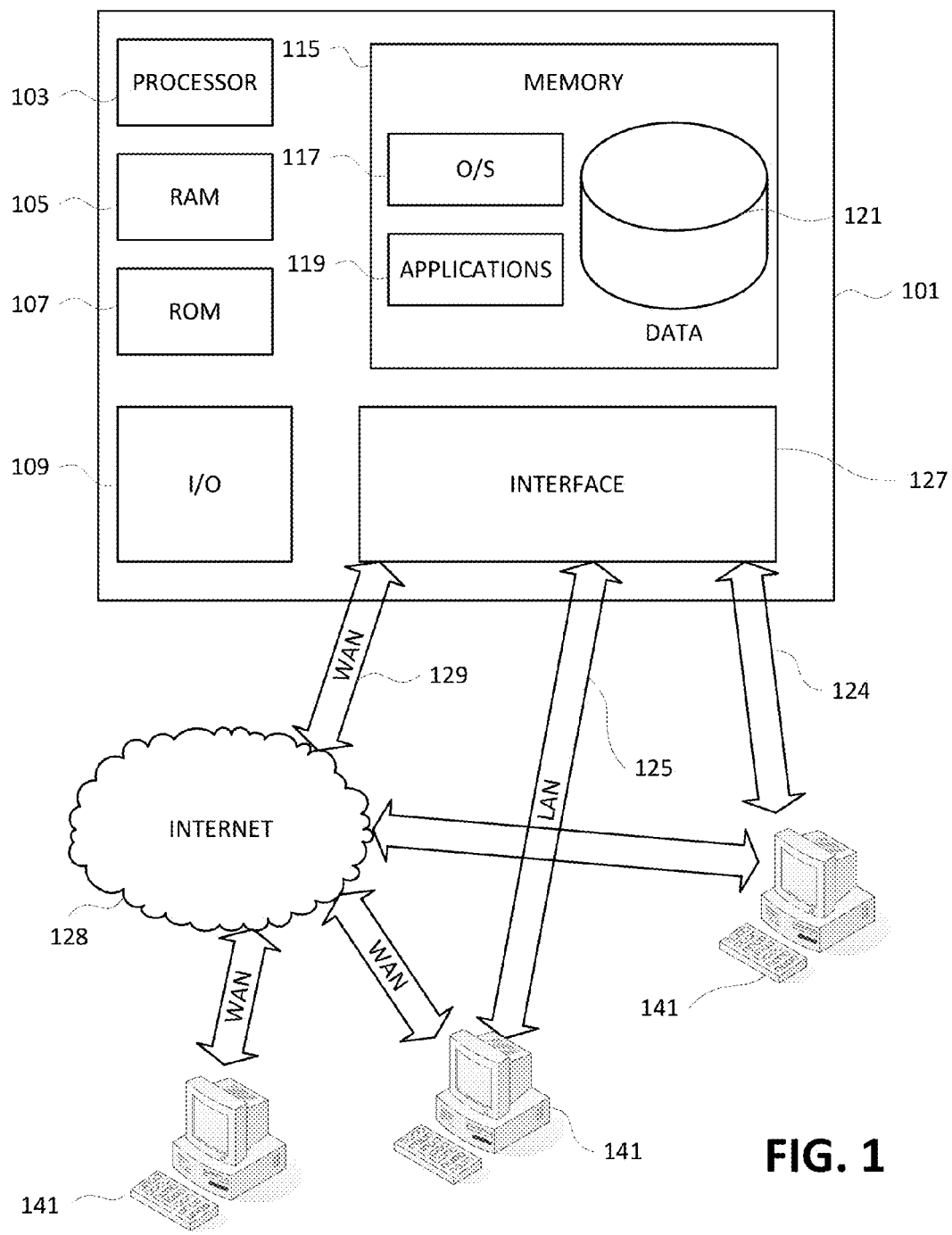
FIG. 1 is a schematic diagram of one embodiment of a computer device that may be used to perform one or more illustrative aspects described herein.

FIG. 1 illustrates a block diagram of a computer device or computer system 101 that may be used according to an illustrative embodiment. The computer device 101 may have a processor 103 for controlling overall operation of the computer device 101 and its associated components, including RAM 105, ROM 107, input/output module 109, and memory 115. I/O 109 may include a user input device through which a user of computer device 101 may provide input, such as a microphone, keypad, touch screen, mouse, and/or stylus, and may also include one or more of a speaker for providing audio output and a video display device for providing textual, audiovisual and/or graphical output. The I/O 109 may also include equipment for collecting other forms of information or input, such as a device for collecting biometric input and/or audio input, a barcode reader or other device for collecting graphic input, or other type of input device. Examples of such biometric input can include facial recognition, fingerprint reading, iris scanning, voice recognition, and other types of biometric input.

Software may be stored within memory 115 and/or other storage to provide instructions to processor 103 for enabling the computer device 101 to perform various functions, including functions relating to the methods described herein. For example, memory 115 may store software used by the computer device 101, such as an operating system 117, application programs 119, and an associated database 121. Alternatively, some or all of the computer executable instructions may be embodied in hardware or firmware (not shown). As described in detail below, the database 121 may provide centralized storage of account information and account holder information for a business, allowing interoperability between different elements of the business residing at different physical locations. It is understood that a computer device 101, single processor 103, and single memory 115 are shown and described for sake of simplicity, and that the computer device 101, processor 103, and memory 115 may include a plurality of computer devices, processors, and memories respectively, and may comprise a system of computer devices, processors, and/or memories.

The computer device 101 may be configured to operate in a networked environment supporting connections to one or more other computer devices, such as terminals 141. Such other computer devices (e.g. terminals 141) may include any of the components and features of the computer device 101 described herein and illustrated in FIG. 1, as well as other features. The terminals 141 may be personal computers or servers that include many or all of the elements described above relative to the computer device 101. It is understood that the terminals 141 are merely representative, and may be embodied by any suitable type of computer device. The network connections depicted in FIG. 1 include a wide area network (WAN) 129, and may also include other networks, such as a local area network (LAN) 125, a cellular/mobile network 124, and other communication paths, all of which provide connections to terminals 141. The terminals 141 connected to the device 101 can be any type of computer device or component, from other computer devices 101 to servers, personal computers, mobile devices, automobile computers, and any other conceivable type of computer component or device. One or more communications interfaces 127 generally provide connections to these various networks 124, 125, 129. When used in a LAN networking environment, the computer device 101 is connected to the LAN through a network interface or adapter. When used in a WAN networking environment, the computer device 101 may include a modem for establishing communications over the WAN, and may also include transceivers for Wi-Fi, Bluetooth, infrared or other optical communication, near field communication (NFC), among other means. Connection to the cellular/mobile network 124 may be provided, for example, by a GSM/TDMA service provider. The other communication paths mentioned can include direct communication, such as by Bluetooth or Wi-Fi. The WAN 129 can provide connection to the Internet 128, and it is understood that other communication paths, such as cellular/mobile network 124 can also provide Internet connectivity. It is understood that the computer device 101 can connect to one or more of the terminals 141 through more than one of the networks 124, 125, 129. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer device 101 according to an illustrative embodiment may include computer executable instructions for invoking user functionality related to communication, such as email, short message service (SMS), peer-to-peer exchanges, and voice input and speech recognition applications, as well as any other applicable techniques.

The various illustrative embodiments described herein can be used to establish secure communications and/or exchange data between two businesses or other institutions, such as when conducting secure transactions for exchange of funds and/or information. Additionally, the various embodiments described herein can enable identification of and/or differentiation between persons and other users conducting such communications and/or data exchanges on behalf of the institution, on an individual level. In general, various embodiments described herein utilize multiple profiles that are associated with a single business or other institution, where each of the profiles is identified by a unique profile identification (profile ID) that is issued by a central authority. Each profile is also associated with an individual user within the institution, and the user can be authenticated by using its profile ID and providing authentication information, as described below. A profile ID uniquely identifies a profile and is used for authentication purposes. Examples of various types of data that may be used as a profile ID include a code (e.g., numerical or alphanumerical), a private key, certificate, or other stored file, and other types of information.

As used herein, "institution" not only includes any business (including corporations, partnerships, sole proprietorships, and others), but may also include non-profit organizations, educational institutions, religious institutions, or other identifiable organizations. As used herein, "user" refers to any unit within an institution that is capable of exchanging information and/or transacting business, or capable of being used for such purposes, on behalf of the institution, including, without limitation, a person, a department/division or other organizational unit, an email address, a computer device, a monetary account, an authentication key, and other such units. Additionally, it is noted that the term, "within an institution" does not necessarily imply that the user is physically within the institution, and may encompass other users that are at least ostensibly controlled by the institution and/or have the power to act on behalf of the institution, such as an outside vendor or consultant working on behalf of the institution, a related institution (e.g. parent, subsidiary, and others) or entity within such related institution, a bank account for the institution that is held by a bank or other financial institution, and other such examples.

In general, aspects of the disclosure relate to a system and method wherein a central authority acts as a registry of a number of profile IDs, and various institutions (e.g., service providers) can obtain a number of registered profile IDs from the central authority. The service providers can then distribute these registered profile IDs to others (e.g., their clients) for use in establishing secure, authenticated communications for transacting business, exchanging funds, exchanging confidential information, and the like. Each client can be provided with several profile IDs, which the client can assign as it sees fit, such as by assigning a specific person or specific people (e.g., a group or business unit) who can use each profile ID. Each of the profile IDs has corresponding authentication information that must be provided by the user in order to authenticate the profile ID, such as by matching a template stored by the central authority. However, the central authority may optionally be provided with little or no information directly identifying the user(s) associated with each profile ID, with user identification being known and controlled only at the service provider and/or client level. The central authority may thereby authenticate the users of each profile ID in an anonymous manner.

Figure 2:
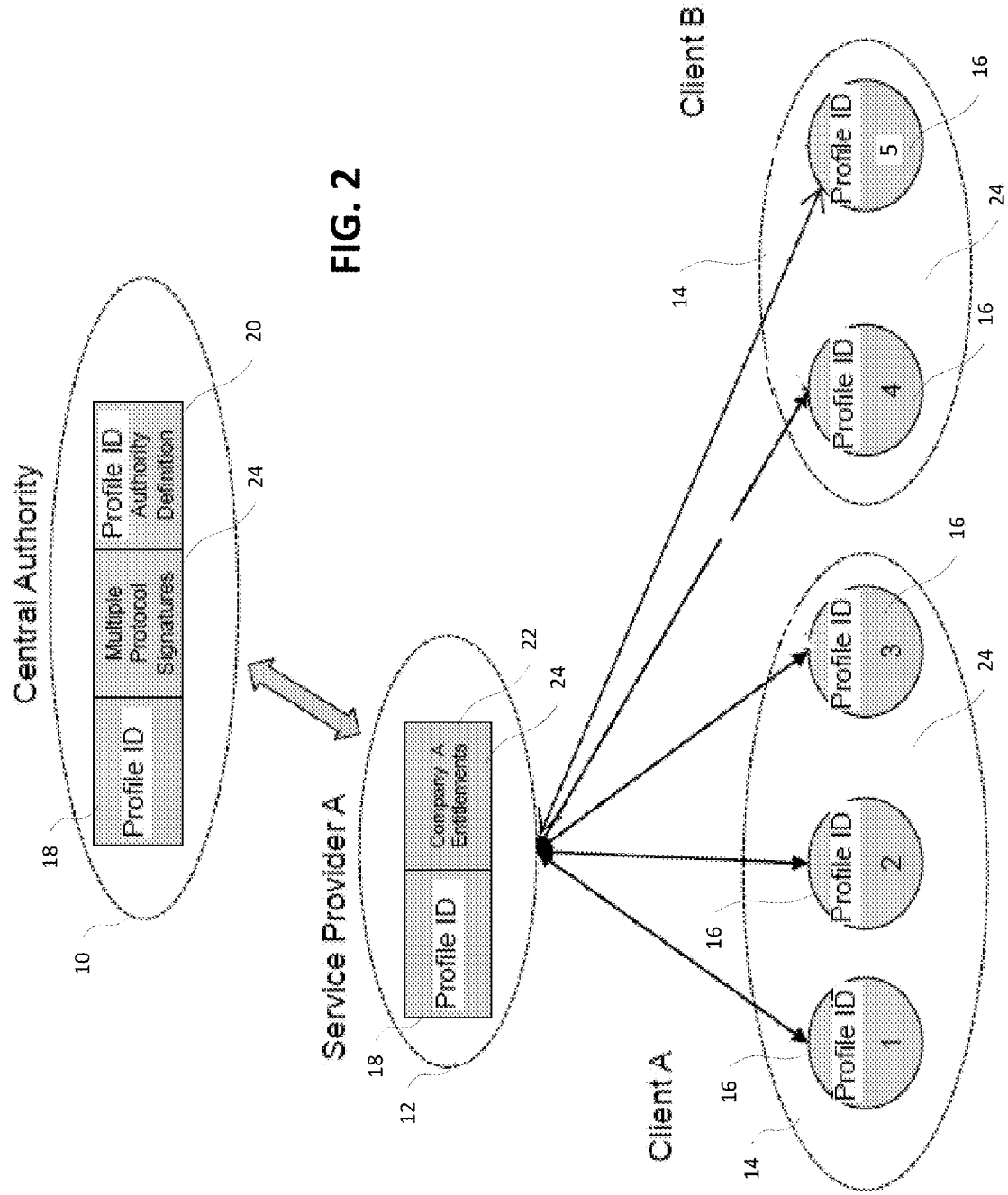
FIG. 2 is a schematic diagram illustrating one embodiment of an infrastructure configuration that is suitable for use according to aspects described herein.

FIG. 2 illustrates one example embodiment of a system and infrastructure that may be used for carrying out certain embodiments described herein. The infrastructure depicted in this embodiment includes a central authority 10, a service provider 12, and one or more clients 14 that are transacting business, exchanging funds, exchanging information, and the like, with the service provider 12. Each of the central authority 10, the service provider 12, and the clients 14 may be institutions as described herein. Additionally, each of the clients 14 may have a plurality of users 16 located within the respective client 14 and/or authorized to act on behalf of the client 14. It is understood that the structure depicted in FIG. 2 is simplified, and that the central authority 10 may interact with a large number of service providers 12, and that each service provider 12 may interact with a large number of clients 14 or only a single client 14 in various embodiments. More than one central authority 10 may exist in some embodiments. In one embodiment, the service provider 12 may be a financial institution, and the clients 14 may all be business clients of the financial institution. The central authority 10 and the service provider 12 may be separate institutions in one embodiment, and in another embodiment, the central authority 10 and the service provider 12 may be part of the same institution, such as different organizational or business units within a single financial institution. In another embodiment, a similar infrastructure may be used for interaction between the central authority 10 and different types of institutions other than a service provider and clients of the service provider. For example, a similar infrastructure may be used for transacting business, exchanging money, exchanging information, and the like, between two financial institutions, between two other institutions storing private information, and other such examples.

Each of the institutions included in the system may include one or more computer devices or systems 24, such as the computer device 101 described above and shown in FIG. 1, which can store and process information. The central authority 10 may act as a registry for the profile IDs 18, and may optionally generate and transmit profile IDs to requesters, such as service providers 12. As shown in FIG. 2, in this embodiment, the central authority 10 maintains a stored record of all profile IDs 18 and the definitions 20 of the profile IDs 18, as well as any necessary protocol signatures (e.g., PGP). The central authority may also provide other services, such as providing keys for encryption and/or decryption of transmitted authentication information and other transmitted information. The definitions 20 may include one or more stored authentication templates for each profile ID 18, which are used in authentication of users of the profile IDs 18. The definitions 20 may also include specification of the users (e.g., specified profile IDs or a specified institution) who have rights to update the stored information, such as the authentication templates, and may include other information as well. In one embodiment, the central authority 10 does not receive or store any private information or information directly identifying the users associated with each profile ID 18, and thus, these users are anonymous to the central authority 10 in this embodiment. It is understood that certain information that may be used to indirectly identify a user may be incidentally included in the definitions 20, such as facial or voice recognition templates in one example. As another example, a person may use a birthdate or portion of their name as part of a passcode. Further examples exist, and it is understood that even if such information exists within the definitions 20, such information might not be stored or indexed in a manner that indicates the information as identifying information.

The service provider 12 in this embodiment also stores a record of the profile IDs 18, as well as any entitlements that are set with respect to each profile ID 18. The clients 14 store records of which profile IDs 18 are assigned to which users 16. In one embodiment, the client 14 has ultimate control over assigning profile IDs 18 to various users 16 within the respective client 14 and/or authorized to act on behalf of the client 14. In one embodiment, both the client 14 and the service provider 12 may store records of the assignments and information identifying the user 16 associated with each profile ID 18. In another embodiment, the client 14 may have exclusive knowledge and control over information identifying which user 16 is associated with each profile and profile ID 18 in one embodiment. Alternately, the service provider 12 may also have at least some knowledge or control over the assignments with respect to one or more clients 14 and/or one or more users 16 within a specific client 14. The assignments of the profile IDs 18 may be stored and utilized by the client's enterprise resource planning (ERP) system in one embodiment. In an additional embodiment, the ERP system may attach the profile ID 18 to communications sent by the user 16, either automatically or at the request of the user 16, once the user 16 is logged into the ERP system.

As described above, in one embodiment, each profile ID may have entitlements 22 associated therewith, and the service provider 12 may store records of these entitlements 22. The clients 14 may also store records of such entitlements 22 in another embodiment. The entitlements 22 set forth rules and limits for actions that the user 16 may take while using its associated profile ID 18, such as when transacting business, exchanging funds, exchanging information, and the like. Some examples of different types of entitlements 22 include limits on access of information of a certain type or security level, time limits on when the profile ID 18 may be used for some or all access or transactions, geographic limits on the user, numerical limits on the amount of funds or information that may be transacted, and other limitations/entitlements. For example, a president, CEO, or department head of a company client 14 may have a profile ID 18 with wide entitlements 22, while the profile ID 18 of another lower-level employee may have more restricted entitlements 22. The entitlements 22 may likewise limit or otherwise govern actions the service provider 12 may take in response to communications sent from the client 14, depending on which profile ID is associated with the communication.

As also described above, the definitions 20 may include one or more stored authentication templates for each profile ID 18. Authentication information transmitted by an user 16 may be accompanied by an identification or indication of the profile ID 18, such as by entering a number, attaching a certificate, or transmitting other identifying information. Authentication may also require transmission of some authentication information that can be matched to the template to determine whether the authentication attempt is valid. Such authentication information may include one or more of various types of information, including without limitation: a passcode, a key, certificate, or other stored file, a barcode or other graphic information, RFID information, biometric information, a signature, and other types of authentication information, including any authentication information known in the art. The system may further be modified to utilize any techniques for authentication that may be developed in the future, as a new authentication template for the new authentication technique may be created, stored, and utilized as described above. In one embodiment, at least some type of biometric information may be required, such as facial recognition, fingerprint identification, iris scanning, voice recognition, and/or other types of biometric input. Authentication and matching may involve comparison of the received authentication information with a stored authentication template, such as to determine whether two passcodes match. In the case of biometric information, this authentication can include comparison of selected points of the collected biometric information to selected points of the template. This authentication and matching may be performed by the service provider 12 and/or the central authority 10 in one embodiment, with the templates being stored by the central authority 10. In such an embodiment, the authentication information (which may contain sensitive information, especially in the case of biometric authentication) is not stored in the same location as any personal identifying information of the users, for increased privacy. In another embodiment, the service provider 12 may additionally or alternately store the authentication templates. It is understood that different profile IDs 18 may require different types or numbers of authentication methods.

Figure 3:
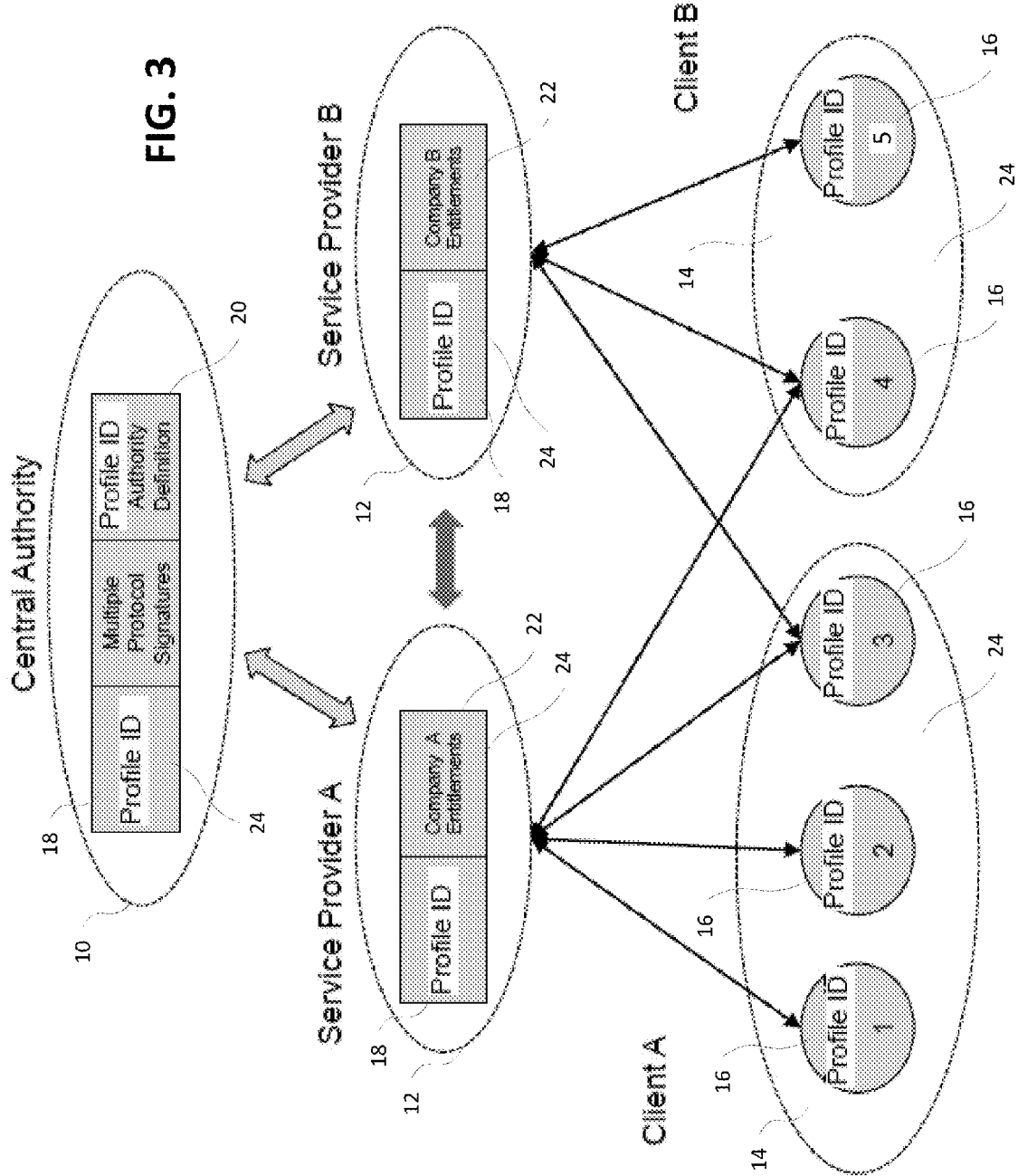
FIG. 3 is a schematic diagram illustrating another embodiment of an infrastructure configuration that is suitable for use according to aspects described herein.

FIG. 3 illustrates another example embodiment of a system and infrastructure that can be used for carrying out certain embodiments. The infrastructure depicted in this embodiment includes the central authority 10, two service providers 12, and clients 14 that are transacting business, exchanging funds, exchanging information, and the like with the service providers 12. Any of the variations and additional or alternate features described with respect to the embodiment in FIG. 2 may be incorporated into this embodiment. For example, it is understood that the structure depicted in FIG. 3 is simplified, and that the central authority 10 may interact with a larger number of service providers 12, and that each service provider 12 may interact with a large number of clients 14 or only a single client 14 in various embodiments. In this embodiment, one or more of the clients 14 may be engaging in transactions with two (or more) different service providers 12. In such a case, service providers 12 may share one or more of the profile IDs 18, so that an user 16 may use the same profile ID 18 for authentication with multiple service providers 12. The two service providers 12 may exchange at least some information about the profile IDs 18 and/or the users 16 in this embodiment, and such information exchange is subject to applicable privacy laws. For example, the service provider 12 that originally requested the profile ID 18 may inform the other service provider 12 of the profile ID 18 and the identity of the user 16 associated with the profile ID 18, if the identity is known to the service provider 12 (assuming this informing is necessary and permissible). This exchange may be transparent or hidden from the client, depending on circumstances. As also illustrated in FIG. 3, each service provider 12 may define and store its own set of entitlements 22 with respect to the shared profile IDs 18. The second service provider 12 may be able to perform some or all of the same actions with respect to the profile IDs as the originating service provider 12 (including any actions described below with respect to FIG. 4) in one embodiment.

In one embodiment, both of the service providers 12 may be financial institutions, and the clients 14 may all be business clients of the financial institutions. The central authority 10 may be an institution separate from both service providers 12 in one embodiment, and in another embodiment, the central authority 10 and at least one service provider 12 may be part of the same institution, such as different organizational or business units within a single financial institution. For example, the system may be implemented within a single institution and may include a central authority 10 and multiple organizational units functioning as service providers 12 within the same institution. As another example, a single institution including the central authority 10 and a first of the service providers 12 may permit one or more separate institutions (e.g. other service providers 12) to utilize profile IDs, and may also distribute profile IDs to the additional service provider(s) 12 independently of the first service provider 12. As described above, in another embodiment, a similar infrastructure may be used for interaction between the central authority 10 and different types of entities other than service providers and clients of the service providers.

Figure 4:
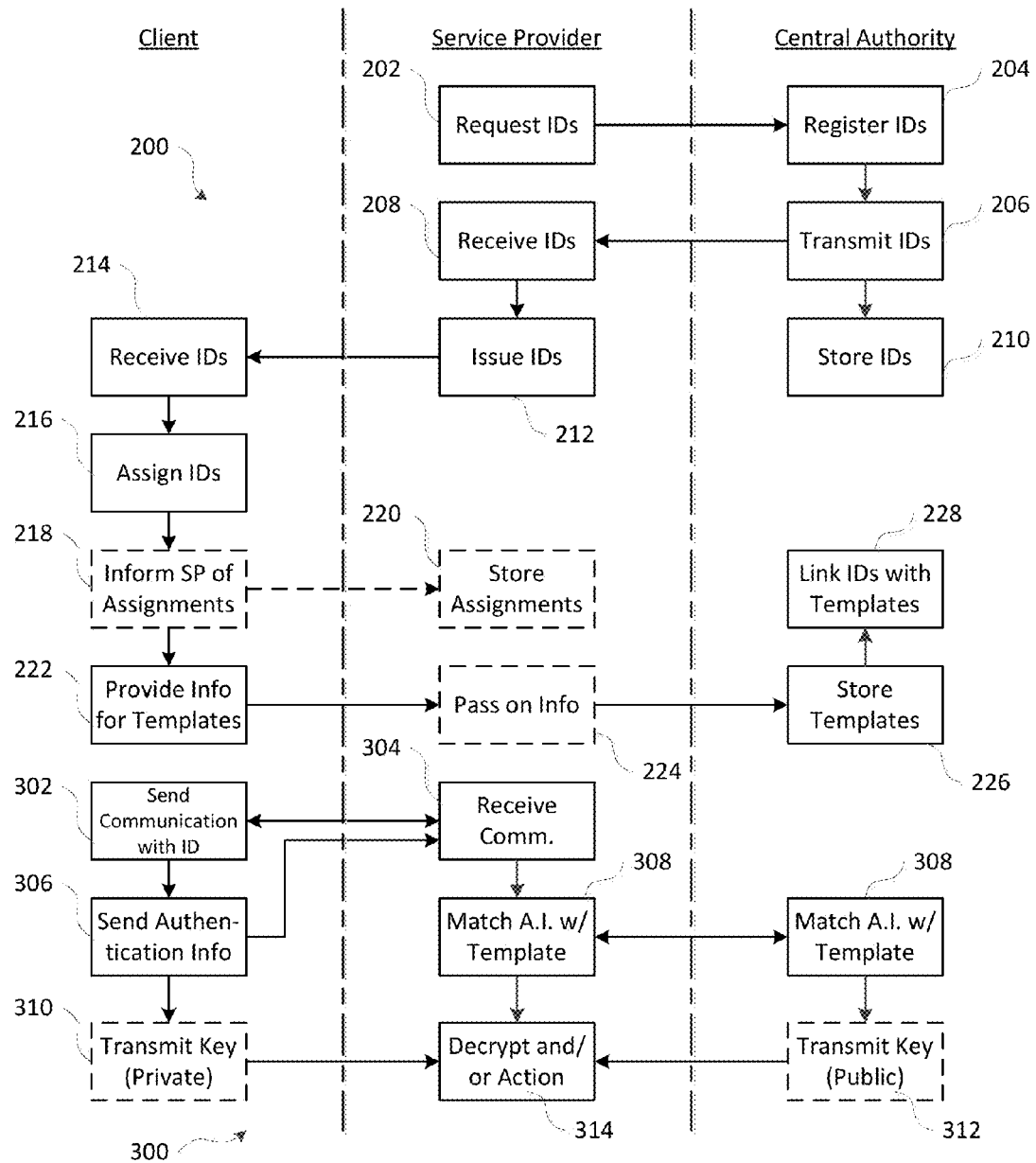
FIG. 4 is a flow diagram illustrating one embodiment of a process according to illustrative aspects described herein.

FIG. 4 illustrates one embodiment of a process 200 for setting up authentication profiles for later authentication and a process 300 of authentication and exchanging secure communications using such authentication profiles. It is noted that optional actions in the embodiments in FIG. 4 are indicated with broken lines, and it is understood that such actions may be omitted in some embodiments or may be non-optional in other embodiments. It is also understood that other actions may be viewed as optional or eliminated in further embodiments. As with FIGS. 2-3, the parties involved in the method are identified as the central authority, service providers, and clients, although it is understood that different institutions may utilize at least some aspects of the method, including institutions with different types of relationships other than service provider-client.

Generally, the central authority registers profile IDs, which are then provided to one or more service providers. In this embodiment, the central authority generates and then distributes the profile IDs, however in another embodiment, a service provider may generate a profile ID and request to have the profile ID registered by the central authority, thereby providing the profile ID for use by the service provider. If a code is used as a profile ID, the code may be randomly generated, or in other embodiments, at least a portion of the code may be indicative of the central authority and/or the service provider involved in its registration. In the embodiment of the process 200 shown in FIG. 4, the service provider begins the process by requesting one or more profile IDs from the central authority, at 202, such as by transmitting an electronic request or other technique. The request may be a request to generate and/or register one or more profile IDs. The central authority registers the profile IDs, at 204, which may be done subsequently in response to the request, or may alternately be done before the request is received and held until requested. The service provider may request that all profile IDs be delivered contemporaneously, or may request that some profile IDs be delivered at a specified or unspecified later date. Additionally, the request may be initiated by the service provider in response to a request by the client. As discussed above, in one embodiment, the request does not include any private information or information identifying the user or the client that will be associated with each profile ID, or may contain no information directly identifying such user or client. The central authority transmits the profile IDs in response to the request, at 206, and the profile IDs are received by the service provider, at 208. The central authority also stores or otherwise records the profile IDs if they were not already stored, at 210, and the service provider may do the same.

After having received the profile IDs, the service provider issues the profile IDs to one or more clients or other institutions transacting business, exchanging funds, and/or exchanging information, and the like, at 212. In one embodiment, the service provider may wait to request the profile IDs from the central authority until the service provider wants to issue the profile IDs, and in another embodiment, the service provider may maintain a stock of profile IDs, and the issuing may be performed well after the request. These profile IDs are received by the client(s) or other institution(s) at 214. The client(s) may then assign their respective profile IDs to different users within the client(s), at 216, and this information may be stored by the client(s). In one embodiment, the profile IDs may be installed as private keys within a client's computer system. The assignment information may optionally be transmitted to the service provider to inform the service provider of some or all of the identities of the users associated with the profile IDs, at 218, and the service provider may store this information, at 220. In one embodiment, the service provider may work with the client in choosing the users that will be assigned profile IDs. Additionally, a client may be provided with only a single profile and profile ID if desired, so that clients are not required to define multiple profiles.

The client may then provide information to establish authentication templates for use in later authenticating the profiles, at 222, such as passcodes, signatures, facial or voice recognition data, iris scan data, and other types of authentication information for the users associated with the profile IDs. In this embodiment, the authentication template information is stored by the central authority, and thus, the information is provided at 222 to the central authority, where the information is stored, at 226. The template information is also linked with the profile IDs in the memory at the central authority, at 228. The template information may flow through the service provider, and in one embodiment, the service provider may pass on the template information and/or store the information, at 224. In another embodiment, the service provider may retain the template information and may perform later authentications without input from or involvement by the central authority.

The embodiment of the process 300 can be used to establish a secure communications channel (e.g., an HTTPS connection) and/or exchange data or any other digital communication between two parties, such as a service provider and a client, as shown in FIG. 4. The process 300 may typically begin by the client and the service provider attempting to set up a secure communications channel and/or exchange confidential data (e.g., conducting a secure transaction). This may be initiated by the client, the service provider, or mutually. In the embodiment of FIG. 4, the process 300 begins by the client sending a digital/electronic communication, at 302, which is received by the service provider at 304. It is understood that the communication may be disregarded by the service provider if it is received without a profile ID. At some point, the user at the client that is involved in the communication provides authentication information and an indication of the user's profile ID. In the embodiment of FIG. 4, the user may be already logged into the client's ERP system, and the ERP system may automatically attach the profile ID to the communication (e.g., as a key, certificate, or signature), which may be invisible to the user or done at the user's direction. The indication of the profile ID may alternately include manually entering an alphanumeric identifier of the profile ID, manually attaching a stored authentication file or signature, and/or other techniques. Authentication information is provided by the client, at 306. In one embodiment, the authentication information may also be provided automatically by the client computer system, such as by attaching the authentication information to the communication along with the indication of the profile ID, which may be invisible to the user or at the user's direction. In one embodiment, the user may be prompted to provide the authentication information when sending the communication. A portal and/or website may be provided for transmission of the communication, the authentication information, and/or the indication of the profile ID, in one embodiment. Such a portal may be provided by the service provider and applications on the service provider's servers, or may be provided for the service provider by the central authority and applications on the central authority's servers, or a combination of such techniques.

The service provider and the central authority then match the received authentication information with the authentication template associated with the indicated profile ID, at 308. In one embodiment, the service provider requests the authentication template from the central authority and perform the matching itself. In another embodiment, the service provider may transmit the authentication information to the central authority and the central authority verifies the match as appropriate. It is understood that for certain authentication methods, the central authority and/or the service provider may retain standards for how closely the information much match in order to constitute a successful authentication. For example, for a passcode, an exact match may be required, and alphabetical case may be recognized or ignored. As another example, for biometric information, a match may be found if a certain percentage of the biometric information matches the stored information. Once the authentication has been verified, the service provider may take further action based on the communication, at 314, such as to conduct a transaction of business, funds, and/or information, for example. The actions taken by the service provider in response to the communication, at 314, may be limited or controlled by the entitlements associated with the user's profile ID, as discussed above. The service provider may perform a check of the entitlements associated with the profile ID before taking any action, at 314, and in one embodiment, the service provider may treat a message without a profile ID as having zero entitlements. The service provider may also provide additional or alternate services based on the user's profile ID. The service provider can conduct business with other users within the same client, or within other clients, using processes similar to those as described above, or other embodiments of such processes.

The communications from the client may be encrypted in one embodiment, and the central authority may additionally provide decryption services in connection with the encryption. For example, the client may transmit the communication 302 in an encrypted form, along with an encryption key, at 310. This encryption key may be provided by attachment to the communication. Another encryption key may be provided by the central authority at 312, enabling the service provider to decrypt and read the communication, at 314. This encryption key may be provided by the central authority at the same or substantially the same time as the authentication template or the confirmation of matching authentication information. One or both of the encryption keys may be tied to the profile ID in one embodiment. As shown in FIG. 4, the client provides a private encryption key to the service provider, and the central authority provides a public encryption key. In further embodiments, the communication may be decrypted by the central authority, or the service provider may not need to request the encryption key from the central authority.

In one embodiment, a record of all transactions for a client using any profile ID may be stored, such as by a client computer and/or a computer of the service provider. This record may be queried by the client and/or the service provider to view transactions based on profile ID. On the service provider side, such information may permit billing based on the profile ID involved in a transaction.

In one embodiment, authentication and secure communications transmitted as described above can be compatible with a wide variety of applications and usages. For example, a wide variety of secure payment methods can be implemented with the authentication features described herein, including email-based payment, credit-card based payment, direct debit payments, electronic cheque payments, and others. The use of these features is not limited to financial transactions, and may be used for exchange of a wide variety of data and for many different applications.

The profile IDs discussed herein may have limited lifespans, which may be set either upon generation or at a later date, e.g. by the central authority, the service provider, or the client. On or before expiration of the lifespan of a profile ID, the profile ID can be refreshed or reconfirmed. This refreshing may be initiated by the service provider in one embodiment by transmitting a request received by the central authority, and may include either a reconfirmation of the profile ID and the corresponding authentication template or a change of the authentication template and/or addition or removal of one or more authentication templates.

In some embodiments, not all of the steps and features of the example configurations and processes described above and shown in FIGS. 2-4 may be performed or included. Additionally, in some embodiments, additional or alternate steps or features may be included. It is understood that any communications described herein may be performed electronically over various networks, as described above with respect to FIG. 1, and a portal and/or website may be provided for any or all of such communications. Such communications may additionally or alternately be performed using physical, mechanical, and/or direct audio communications. As used herein, "providing" refers merely to making a feature available for further actions or processing, and does not imply any particular source of creation, nor does it imply any particular method or source of obtaining the feature in question for the purpose of providing.

Aspects of the systems and methods described herein are operational with numerous other general purpose or special purpose computing system environments or configurations, such as the computer device 101 shown in FIG. 1. Examples of well-known computing systems, environments, and/or configurations that may be suitable for use with the embodiments described herein include, but are not limited to, personal computers, server computers, hand-held devices, laptop devices, multiprocessor systems, microprocessor-based systems, set top boxes, programmable consumer electronics, network PCs, minicomputers, mainframe computers, distributed computing environments that include any of the above systems or devices, and the like.

As described above, aspects of the systems and methods described herein may be described in the general context of computer-executable instructions, such as program modules, being executed by a computer. Generally, program modules include routines, programs, objects, components, data structures, and the like, that perform particular tasks or implement particular abstract data types. Such a program module may be contained in a tangible and/or non-transitory computer-readable medium, as described above. The systems and methods described herein may also be practiced in distributed computing environments where tasks are performed by remote processing devices that are linked through a communications network. In a distributed computing environment, program modules may be located in the memory 115, which may include both local and remote computer storage media including memory storage devices. It is understood that connections and communications disclosed herein may be made by any type of wired or wireless connection or communication.

Aspects of the present systems and methods described herein provide many benefits not provided by prior systems and methods for validating offer models. For example, institutions such as service providers are enabled to exchange data and conduct transactions with several different users within another institution, such as a client, and at least one of the institutions will have knowledge of the user that is involved in the communication. Additionally, the recognition of specific people or other users that are acting on behalf of a business or other institution allows the ability to create limits and other entitlements for such specific people or other users. Further, the recognition of specific people or other users can simplify auditing of transactions by a financial institution or a client of the institution. As another example, the various users can be authenticated anonymously, as the central authority may perform such authentications without any knowledge or direct knowledge of the identity of the user that is being authenticated. Such increased privacy is particularly useful when biometric information is exchanged, as storage of biometric information for biometric authentication often raises a greater degree of privacy concerns as compared to other authentication methods, such as knowledge-based or token-based authentication methods. As a further example, the use of entitlements controllable by a service provider simplifies security rules and procedures, and may make some existing security features obsolete. As yet another example, different service providers can choose to recognize profiles created by other service providers, creating greater simplicity and ease of use for clients engaged with a number of different service providers. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the systems and methods described herein may be in other specific forms without departing from the spirit or central characteristics thereof. The present examples therefore are to be considered in all respects as illustrative and not restrictive, and the invention is not to be limited to the details given herein. The terms "plurality" and "multiple," as used herein, indicate any number greater than one, either disjunctively or conjunctively, as necessary, up to an infinite number. Accordingly, while the specific examples have been illustrated and described, numerous modifications come to mind without significantly departing from the spirit of the invention and the scope of protection is only limited by the scope of the accompanying claims.

What is claimed is:

1. A computer implemented method comprising:

requesting by an financial institution's computer, a first profile ID and a second profile ID from a central registry using the computer system in communication with the central registry, wherein the request does not include information identifying the first or second users;

registering by the central registry, the first profile ID and the second profile ID;

storing by the central registry the registered first and second profile IDs, wherein the central registry does not store information identifying the first or second users;

transmitting by the central registry the first profile ID and the second profile ID to the financial institution's computer in communication with the central registry;

receiving the first and second profile IDs by the computer system, from the central registry;

providing by the institution's computer system the registered first and second profile IDs to entities doing business with the financial institution, wherein the registered first and second profile IDs are utilized by the entities for authentication of first and second users at the entity, respectively, authorized to act on behalf of the entities, wherein the first profile ID corresponds to a user established first authentication information template for the first user and the second profile ID corresponds to a user established second authentication information template for the second user;

transmitting the first and second user authentication information templates to the central registry by the financial institution's computer system and linked to the first and second profile IDs in memory of the central registry, wherein the first and second authentication information templates transmitted to the central registry do not include information identifying the first and second user;

receiving, at the financial institution's computer system an encrypted electronic communication to conduct electronic transaction or exchange data electronically from the first user including a first authentication information and an indication of the first profile ID from the first user;

requesting by the financial institution from the central registry the first authorization information template linked to the first profile ID;

receiving the first authentication information template from the central registry at the financial institution's computer system; and matching the first authentication information to the first authentication information template, using the financial institution's computer system, wherein actions taken with respect to the electronic communication from the user are limited by entitlement setting on actions associated with the first user's profile ID after successful matching.

2. The method of claim 1, wherein the electronic communication relates to a transaction with the entity involving the first user, further comprising conducting the transaction with the entity involving the first user, using the financial institution's computer system, wherein matching of the first authentication information to the first authentication template corresponding to the first profile ID is required for completion of the transaction.

3. The method of claim 1, wherein the method is performed by the financial institution doing business with the client and utilizing the financial institution's computer system, further comprising exchanging information about the first and second profile IDs with a second financial institution doing business with the entity, to enable the second financial institution's computer to authenticate the first and second users using the first and second profile IDs.

4. The method of claim 1, wherein the first profile ID is associated with first entitlements, further comprising taking additional actions with respect to the communication that are limited by the first entitlements.

5. The method of claim 4, wherein the second profile ID is associated with second entitlements that are different from the first entitlements, further comprising taking second additional actions with respect to a second electronic communication received from the second user that are limited by the second entitlements.

6. The method of claim 1, wherein the indication of the first profile ID and the first authentication information are included within the electronic communication.

7. The method of claim 1, further comprising requesting the first authentication information template from the central registry, by the financial institution's computer system, after receiving the indication of the first profile ID.

8. The method of claim 1, wherein the encrypted electronic communication, further comprising:
receiving, at the financial institution's computer system, a first encryption key from the first user in connection with the electronic communication;
receiving, at the financial institution's computer system, a second encryption key from the central registry; and
decrypting the electronic communication using the first and second encryption keys.

9. A non-transitory computer-readable medium comprising computer-executable instructions configured to cause a computer device to:
request by a financial institution's computer, a first profile ID and a second profile ID from a central registry, wherein the request does not include information identifying the first or second users;
register the first profile ID and the second profile ID with the central registry, wherein the central registry does not store information identifying the first or second users;
receive the first and second profile IDs from the central registry;
provide the first and second profile IDs to entities doing business with the financial institution, wherein the registered first and second profile IDs are utilized by the entities for authentication of first and second users, respectively, authorized to act on behalf of the entities, wherein the first profile ID corresponds to a user at the entity established first authentication information template for the first user and the second profile ID corresponds to a user at the entity established second authentication information template for the second user, and wherein the first and second authentication information templates are provided to the central registry by the financial institution and stored by the central registry, wherein the first and second authentication information templates transmitted to the central registry do not include information identifying the first and second user;
receive an encrypted electronic communication to conduct electronic transaction or exchange data electronically from the first user including a first authentication information and an indication of the first profile ID from the first user;
request by the financial institution from the central registry the first authorization template information linked to the first profile ID;
receive the first authentication information template from the central registry; and
match the first authentication information to the first authentication information template by the financial institution's computer, wherein actions taken with respect to the electronic communication from the user are limited by entitlement setting on actions associated with the first user's profile ID after successful matching.

10. The non-transitory computer readable medium of claim 9, wherein the electronic communication relates to a transaction with the entity involving the first user, and wherein the instructions are further configured to cause the computer device to: conduct the transaction with the entity involving the first user, wherein matching of the first authentication information to the first authentication template corresponding to the first profile ID is required for completion of the transaction.

11. The non-transitory computer readable medium of claim 9, wherein the indication of the first profile ID and the first authentication information are included within the electronic communication.

12. A computer system comprising:
a memory configured for storing information; and
a processor in communication with the memory, the processor being configured to:
request by a financial institution's computer, a first profile ID and a second profile ID from a central registry, wherein the request does not include information identifying the first or second users;
register the first profile ID and a second profile ID with the central registry, wherein the central registry does not store information identifying the first or second users;
transmit by the central registry the first profile ID and the second profile ID to the financial institution's computer in communication with the central registry;
receive the first and second profile IDs from the central registry;
provide the first and second profile IDs to entities doing business with the financial institution, wherein the registered first and second profile IDs are utilized by the financial institution's computer for authentication of first and second users, respectively, authorized to act on behalf of the entity, wherein the first profile ID corresponds to a first authentication information template for the first user and the second profile ID corresponds to a second authentication information template for the second user, and wherein the first and second authentication information templates provided to the central registry by the financial institution's computer and are stored by the central registry, wherein the first and second authentication information templates transmitted to the central registry do not include information identifying the first and second user;

receive at the financial institution's computer an encrypted electronic communication to conduct electronic transaction or exchange data electronically from the first user including a first authentication information and an indication of the first profile ID from the first user;

request by the financial institution's computer from the central registry the first authorization template information linked to the first profile ID;

receive the first authentication information template from the central registry; and match the first authentication information to the first authentication information template, wherein actions taken with respect to the encrypted electronic communication from the user are limited by entitlement setting on actions associated with the first user's profile ID after successful matching.

13. The computer system of claim 12, wherein the encrypted electronic communication relates to a transaction with the entity involving the first user, and wherein the processor is further configured to: conduct the transaction with the entity involving the first user, wherein matching of the first authentication information to the first authentication information template corresponding to the first profile ID is required for completion of the transaction.

14. The computer system of claim 12, wherein the indication of the first profile ID and the first authentication information are included within the electronic communication.

15. A computer implemented method comprising:
receiving by a central registry, at a computer system, a request to register first and second profile IDs from a financial institution's doing business with an entity, wherein the first and second profile IDs are associated with first and second users, respectively, authorized to act on behalf of the entity, wherein the first profile ID corresponds to a user established first authentication information template for the first user and the second profile ID corresponds to a user established second authentication information template for the second user, and wherein the request does not include information identifying the first or second users;

transmitting a notice of registration by the central authority of the first and second profile IDs to the financial institution, using the computer system;

storing by the central authority the first and second profile IDs and the first and second authentication information templates in memory in communication with the computer system, wherein the central registry does not store information identifying the first or second users, wherein the first profile ID is associated with the first authentication information template and the second profile ID is associated with the second authentication information template in the memory, wherein the first and second authentication information templates stored by the central registry do not include information identifying the first and second user;

receiving, at the computer system, an indication of the first profile ID from the financial institution; and transmitting by the central authority the first authentication information template, from the computer system to the institution's after receiving the indication of the first profile ID.

16. The method of claim 15, further comprising receiving by the central registry a request for the first authentication information template, at the computer system from the financial institution.

17. The method of claim 15, further comprising:
receiving by the central registry, at the computer system, an indication of the second profile ID from the financial institution; and
transmitting by the central registry the second authentication information template, from the computer system to the financial institution after receiving the indication of the second profile ID.

18. The method of claim 15, wherein the entity established authentication template comprises one or more types of information selected from a group consisting of: a passcode, a barcode or other graphic information, RFID information, biometric information, a signature, and a stored file.

19. The method of claim 15, further comprising:
receiving by the central registry, at the computer system, a second request to register third and fourth profile IDs from the financial institution doing business with a second financial institution, wherein the third and fourth profile IDs are associated with third and fourth users, respectively, authorized to act on behalf of the second financial institution, wherein the third profile ID corresponds to a third authentication information template for the third user and the fourth profile ID corresponds to a fourth authentication information template for the fourth user, and wherein the request does not include information identifying the third or fourth users;
transmitting by the central registry a notice of registration of the third and fourth profile IDs to the financial institution, using the computer system;
storing by the central registry the third and fourth profile IDs and the third and fourth authentication information templates in memory in communication with the computer system, wherein the third profile ID is associated with the third authentication information template and the fourth profile ID is associated with the fourth authentication information template in the memory, wherein the first and second authentication information templates stored by the central registry do not include information identifying the third and fourth user;
receiving, at the computer system, an indication of the third profile ID from the financial institution; and
transmitting by the central registry the third authentication information template, from the computer system to the financial institution after receiving the indication of the third profile ID.

20. The method of claim 15, further comprising:
receiving by the central registry, at the computer system, a request from the financial institution for an encryption key; and
transmitting by the central registry the encryption key, from the computer system to the financial institution.

21. The method of claim 15, wherein the first and second profile IDs each have limited lifespans, further comprising:
receiving by the central registry, at the computer system, a first refreshment of the first profile ID from the financial institution prior to expiration of the limited lifespan of the first profile ID; and
receiving by the central registry at the computer system, a second refreshment of the second profile ID from the financial institution prior to expiration of the limited lifespan of the second profile ID.

22. A non-transitory computer-readable medium comprising computer-executable instructions configured to cause a computer device to:
- receive by a central registry a request to register first and second profile IDs from a financial institution's doing business with an entity, wherein the first and second profile IDs are associated with first and second users, respectively, authorized to act on behalf of the entity, wherein the first profile ID corresponds to a entity established first authentication information template for the first user and the second profile ID corresponds to a entity established second authentication information template for the second user, and wherein the request does not include information identifying the first or second users;
- transmit by the central registry a notice of registration of the first and second profile IDs to the financial institution;
- store by the central registry the central authority the first and second profile IDs and the first and second authentication information templates in memory, wherein the central registry does not store information identifying the first or second users, wherein the first profile ID is associated with the first authentication information template and the second profile ID is associated with the second authentication information template in the memory, wherein the first and second authentication information templates stored by the central registry do not include information identifying the first and second user;
- receive an indication of the first profile ID from the financial institution; and
- transmit by the central registry the first authentication information template to the financial institution after receiving the indication of the first profile ID.

23. The non-transitory computer readable medium of claim 22, wherein the instructions are further configured to cause the computer device to: receive a request for the first authentication information template, at the computer system from the financial institution.

24. The non-transitory computer readable medium of claim 22, wherein the instructions are further configured to cause the computer device to:
- receive by the central registry a second request to register third and fourth profile IDs from the financial institution doing business with a second financial institution, wherein the third and fourth profile IDs are associated with third and fourth users, respectively, authorized to act on behalf of the second financial institution, wherein the third profile ID corresponds to a third authentication information template for the third user and the fourth profile ID corresponds to a fourth authentication information template for the fourth user, and wherein the request does not include information identifying the third or fourth users;
- transmit by the central registry a notice of registration of the third and fourth profile IDs to the financial institution;
- store by the central registry the third and fourth profile IDs and the third and fourth authentication information templates in memory, wherein the third profile ID is associated with the third authentication information template and the fourth profile ID is associated with the fourth authentication information template in the memory, wherein the third and fourth authentication templates transmitted to the central registry do not include information identifying the third and fourth users;
- receive an indication of the third profile ID from the financial institution; and
- transmit by the central registry the third authentication information template to the financial institution after receiving the indication of the third profile ID.

25. The non-transitory computer readable medium of claim 22, wherein the first and second profile IDs each have limited lifespans, and wherein the instructions are further configured to cause the computer device to:
- receive by the central registry a first refreshment of the first profile ID from the financial institution prior to expiration of the limited lifespan of the first profile ID; and
- receive by the central registry a second refreshment of the second profile ID from the financial institution prior to expiration of the limited lifespan of the second profile ID.

26. A computer system comprising:
- a memory configured for storing information; and
- a processor in communication with the memory, the processor being configured to:
  - receive by a central registry a request to register first and second profile IDs from a financial institution's doing business with an entity, wherein the first and second profile IDs are associated with first and second users, respectively, authorized to act on behalf of the entity, wherein the first profile ID corresponds to a user established first authentication information template for the first user and the second profile ID corresponds to a user established second authentication information template for the second user, and wherein the request does not include information identifying the first or second users;
  - transmit by the central registry a notice of registration of the first and second profile IDs to the financial institution;
  - store by the central registry the first and second profile IDs and the first and second authentication information templates in memory, wherein the central registry does not store information identifying the first or second users, wherein the first profile ID is associated with the first authentication information template and the second profile ID is associated with the second authentication information template in the memory, wherein the first and second authentication information templates stored by the central registry do not include information identifying the first and second user;
  - receive an indication of the first profile ID from the financial institution; and
  - transmit by the central registry the first authentication template to the financial institution after receiving the indication of the first profile ID.

27. The computer system of claim 26, wherein the processor is further configured to: receive by the central registry a request for the first authentication information template, at the computer system from the financial institution.

28. The computer system of claim 26, wherein the processor is further configured to:
- receive by the central registry a second request to register third and fourth profile IDs from the financial institution doing business with a second financial institution, wherein the third and fourth profile IDs are associated with third and fourth users, respectively, authorized to act on behalf of the second financial institution, wherein the third profile ID corresponds to a third authentication information template for the third user and the fourth profile ID corresponds to a fourth authentication information template for the fourth user, and wherein the request does not include information identifying the third or fourth users;

transmit by the central registry a notice of registration of the third and fourth profile IDs to the financial institution;

store by the central registry the third and fourth profile IDs and the third and fourth authentication information templates in memory, wherein the third profile ID is associated with the third authentication information template and the fourth profile ID is associated with the fourth authentication information template in the memory, wherein the third and fourth authentication templates transmitted to the central registry do not include information identifying the third or fourth users;

receive an indication of the third profile ID from the financial institution; and transmit by the central registry the third authentication information template to the financial institution after receiving the indication of the third profile ID.

29. The computer system of claim 26, wherein the first and second profile IDs each have limited lifespans, and wherein the processor is further configured to:

receive by the central registry a first refreshment of the first profile ID from the financial institution prior to expiration of the limited lifespan of the first profile ID; and receive by the central registry a second refreshment of the second profile ID from the financial institution prior to expiration of the limited lifespan of the second profile ID.

* * * * *